(12) United States Patent
Pandey (10) Patent No.: US 6,826,482 B2
(45) Date of Patent: Nov. 30, 2004

(54) WELLBORE TREATMENT FLUID SELECTION ADVISOR

(75) Inventor: Vibhas Pandey, Stafford, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/248,676

(22) Filed: Feb. 7, 2003

(65) Prior Publication Data

US 2004/0154801 A1 Aug. 12, 2004

(51) Int. Cl.$^7$ .............................................. E21B 43/04
(52) U.S. Cl. ........................... 702/6; 166/307; 507/277
(58) Field of Search .............................. 702/6; 507/277, 507/225; 166/307, 250; 252/8.55; 173/863.23; 250/269.1

(56) References Cited

U.S. PATENT DOCUMENTS

| | | | | |
|---|---|---|---|---|
| 4,359,391 A | * | 11/1982 | Salathiel et al. | 252/8.55 |
| 4,997,582 A | * | 3/1991 | Clark et al. | 252/8.553 |
| 6,068,056 A | * | 5/2000 | Frenier et al. | |
| 6,562,764 B1 | * | 5/2003 | Donaldson et al. | 507/277 |

OTHER PUBLICATIONS

Merriam–Webster's, Collegiate Dictionary Tenth Edition, Merriam–Webster Inc. Tenth, Selected pages on idiomatic, adviser, cumulate, confidence, impute, indicia, scenario, attached.*
*Development of an Expert System for Solids Control in Drilling Fluids*—V.J. Pandey and S.O. Osisanya.
*Expert Systems: A 5–Year Perspective*—D.J. MacAllister, Ron Day and M.D. McCormack.
SPE 16839 —*Twenty–Seven Years after Grayson: Who is using Decision Analysis?*—J. Williams.
SPE 24418 —*Use of New Technologies for Knowledge–Based Systems Development*—R.G. Fenoul and Alain Vaussard.
SPE 24416 —*Development of Expert Systems to Assist with Complex Fluid Designs*—Ta–Jen Chiu, E.A. Caudell and Fen–Lin Wu.
SPE 26188 —*Using an Expert System to Select the Optimal Fracturing Fluid and Treatment Volume*—S.A.Holditch, Hongjie Xiong, Jose Rueda and Zillur Rahim.
*PC–Based Expert System Aids Optimum Mud Selection*–by Noel Affleck and Mario Zamora. Petroleum Engineer International, Jan. 1987.
*Knowledge–Based Expert System Eases Cement Slurry Design*: David Kulakofsky and Ronald J. Crook.

* cited by examiner

Primary Examiner—John Barlow
Assistant Examiner—Victor J. Taylor
(74) Attorney, Agent, or Firm—Robin Nava; Brigitte L. Echols; John Ryberg (57) ABSTRACT

The invention is an interactive computer system for help in selecting well-services treatment fluid comprising a set of fluid families, a set of relevant fluid characteristics and a set of digital ratings of each fluid family with regard to these characteristics. The system further includes a set of job parameters pertaining to the treatment and qualitative ratings of said parameters estimating their relevance in the effective success of a treatment. An interface allows the user to enter the job parameters values known to him. Built in rules, associated with calculating means including an integrated spreadsheet, match fluid characteristics and job parameters and trigger the elimination of fluids that are not compatible with some value of the job parameters and compute a confidence index for the non-eliminated fluid families, said confidence index based on the one the sum of the products of the fluid families digital ratings and on the rating of the known job parameter. The system also includes means to display the results.

10 Claims, 6 Drawing Sheets

| | A | B | C | D | E | F | G | H | I |
|---|---|---|---|---|---|---|---|---|---|
| 1 | FLUID # | FILTER I | GELLED OIL | FORMATION IS | | FILTER II | | | FILTER I+II |
| 2 | | | | FORMATION IS | | FORMATION TYPE IS: | | | |
| 3 | | | | WATER-SENSITIVE | NOT SURE | GAS | OIL | GAS CONDENSATE | |
| 4 | FAMILY 1 | TRUE | NO | YES | TRUE | TRUE | TRUE | TRUE | TRUE |
| 5 | FAMILY 2 | TRUE | YES | NO | TRUE | FALSE | TRUE | TRUE | FALSE |
| 6 | FAMILY 3 | TRUE | YES | YES | TRUE | TRUE | TRUE | TRUE | TRUE |
| 7 | FAMILY 4 | FALSE | YES | YES | FALSE | FALSE | FALSE | FALSE | FALSE |

FIG.3

| Well Details: | |
|---|---|
| BHST* | 195 |
| Location | Offshore |
| Reservoir Fluid** | Gas |
| Surface Temperature | 80 |
| Payzone Top, MD | 8500 |
| Payzone, TVD** | 8500 |
| Tubular I.D. | 4.000 |
| Tortuosity Expected? | Yes |
| Job Pumped through? | Casing |
| Max Wellhead Pressures | 5000 |
| Formation Details: | |
| Reservoir Pressure** | 4500 |
| H2O Sensitive Form.?** | No |
| Using Clay Stabilizers? | Yes |
| Permeability** | Below 0.1 |
| Naturally Fractured? | No |
| Swelling Clay Content | High |
| Youngs Modulus | Below 1.0 E+6 |
| Thin zone with high stress? | Yes |
| Formation pH Sensitive? | No |

*FIG.4*

| | A | B | C | D | E |
|---|---|---|---|---|---|
| 1 | | | | | |
| 2 | | | | | |
| 3 | FLUID CHARACTERISTICS | SITUATION | FINAL RATING | IMPORTANCE REAL CASE FORMULA | RATING |
| 4 | FRAC FLUID EMULSION TENDENCY. COMPATIBILITY WITH FORMATION FLUIDS | 1.CONDENSATE WELL | 3 | =IF(WELL_TYPE="CONDENSATE",C4,0) | 0 |
| 5 | | 2.HEAVY OIL WELL | 5 | =IF(AND(WELL_TYPE="HEAVY OIL")=TRUE,C5,0) | 0 |
| 6 | | 3.OIL IN WINTER | 5 | =IF(AND(EARTH_TEMP>0,WELL_TYPE="HEAVY OIL")=TRUE,IF(EARTH_TEMP<60,C6,0),0) | 0 |
| 7 | GAS FORMATION-RTIV.X OR CAPILLARY EFFECT | 1.TIGHT GAS RESERVOIR | 3 | =IF(WELL_TYPE="GAS",IF(PERMEABILITY<=0.1,C7,0),0) | 0 |
| 8 | | 2. HIGH PERMEABILITY RESERVOIR | 1 | =IF(PERMEABILITY="ABOVE 200",C8,0) | 0 |
| 9 | CLAY SENSITIVITY | 1.HIGH CONTENT OF SWELLING CLAYS (LOW PERM) | 4 | =IF(SWELLING_CLAYS="HIGH",IF(PERMEABILITY="ABOVE 200",C9,0),0) | 0 |
| 10 | | 2.HIGH CONTENT OF SWELLING CLAYS (LOW PERM) | 2 | =IF(SWELLING_CLAYS="HIGH",IF(PERMEABILITY="ABOVE 200",C10,0),0) | 2 |
| 11 | | 3.LOW CONTENT OF SWELLING CLAYS (SMECTITE) | 2 | =IF(SWELLING_CLAYS="LOW",C11,0) | 0 |
| 12 | pH FORM. COMPATIBILITY | 1.CLIENT REQUESTS NEUTRAL OR LOW pH | 5 | =IF(PH_SENSITIVE="YES",C12,0) | 0 |
| 13 | FRAC FLUID YIELD STRESS EFFECT | 1.HIGH PERM (INTERNAL FILTER CAKE) | 4 | =IF(PERMEABILITY="ABOVE 200",C13,0) | 0 |
| 14 | | 2.MEDIUM TO HIGH PERMEABILITY (WALL BLDG) | 3 | =IF(PERMEABILITY="5 TO 200",C14,0) | 0 |
| 15 | PROPPANT PACK CLEAN UP | 1.HIGH PERMEABILITY | 4 | =IF(PERMEABILITY="ABOVE 200",C15,0) | 0 |
| 16 | | 2.LOW PERMEABILITY | 5 | =IF(PERMEABILITY="BELOW 0.1",C16,0) | 5 |
| 17 | | 3.HIGH RESERVOIR PRESSURE GRAD (>0.35) | 3 | =IF(OR(PAYZONE_TVD<=0,PAYZONE_TVD="NOT SURE",RESERVOIR_PRESSURE="NOT SURE")=TRUE,0,IF(RESERVOIR_PRESSURE/PAYZONE_TVD<0.35,C17,0)) | 3 |
| 18 | | 4.MED. RESERVOIR PRESSURE GRAD (0.25-0.35) | 4 | =IF(OR(PAYZONE_TVD<=0,PAYZONE_TVD="NOT SURE",RESERVOIR_PRESSURE="NOT SURE")=TRUE,0,IF(RESERVOIR_PRESSURE/PAYZONE_TVD>0.25,IF(RESERVOIR_PRESSURE/PAYZONE_TVD<0.36,C18,0))) | 0 |
| 19 | | 5.LOW RESERVOIR PRESS GRAD (<0.25) | 5 | =IF(OR(PAYZONE_TVD<=0,PAYZONE_TVD="NOT SURE",RESERVOIR_PRESSURE="NOT SURE")=TRUE,0,IF(RESERVOIR_PRESSURE/PAYZONE_TVD<=0.25,C19,0)) | 0 |

FIG.5

| # | FLUID CHARACTERISTICS | SITUATION | FINAL RATING | CONFIDENCE CALCULATION | CONFIDENCE |
|---|---|---|---|---|---|
| 1 | FRAC FLUID EMULSION TENDENCY. COMPATIBILITY WITH FORMATION FLUIDS. 1 | 1. CONDENSATE WELL | 3 | IF(WELL_TYPE="NOT SURE",0, FINALRATING/TOTALRATING) | 0 |
|   |   | 2. HEAVY OIL WELL | 5 |   | 3.21% |
|   |   | 3. OIL IN WATER | 5 |   | 3.21% |
| 2 | GAS FORMATION-RTY. K OR CAPILLARY EFFECT | 1. TIGHT GAS RESERVOIR | 3 | IF(PERMEABILITY="NOT SURE", 0,FINALRATING/TOTALRATING) | 1.92% |
|   |   | 2. HIGH PERMEABILITY RESERVOIR | 1 |   | 0.64% |
| 3 | CLAY SENSITIVITY | 1. HIGH CONTENT OF SWELLING CLAYS (HIGH PERM) | 4 | IF(OR(PERMEABILITY="NOT SURE",SWELLING_CLAYS="NOT SURE")=TRUE,0,FINALRATING/TOTALRATING) | 2.56% |
|   |   | 2. HIGH CONTENT OF SWELLING CLAYS (LOW PERM) | 2 |   | 1.28% |
|   |   | 3. LOW CONTENT OF SWELLING CLAYS (SMECTITE) | 2 | IF(SWELLING_CLAYS="NOT SURE",0,FINALRATING/TOTALRATING) | 1.28% |
| 4 | pH FORM. COMPATIBILITY | 1. CLIENT REQUESTS NEUTRAL OR LOW pH | 5 | IF(PH_SENSITIVE="NOT SURE",0,FINALRATING/TOTALRATING) | 3.21% |
| 5 | FRAC FLUID YIELD STRESS EFFECT | 1. HIGH PERM (INTERNAL FILTER CAKE) | 4 | IF(PERMEABILITY="NOT SURE", 0,FINALRATING/TOTALRATING) | 2.56% |
|   |   | 2. MEDIUM TO HIGH PERMEABILITY (WALL BLDG) | 3 |   | 1.92% |

| 15 | SEA WATER | 1. ONLY SEA WATER AVAILABLE | 4 | IF(WATER_TYPE="NOT SURE", 0, FINALRATING/TOTALRATING) | 2.33% |
|---|---|---|---|---|---|
|   |   |   | TOTAL RATING |   | 97.7% |

| # | SITUATION | FLUID A | FLUID B |
|---|---|---|---|
| 1 | 1. CONDENSATE WELL | 3 | 3 |
|   | 2. HEAVY OIL WELL | 3 | 2 |
|   | 3. OIL IN WINTER | 3 | 2 |
| 2 | 1. TIGHT GAS RESERVOIR | 3 | 4 |
|   | 2. HIGH PERMEABILITY RESERVOIR | 2 | 5 |
| 3 | 1. HIGH CONTENT OF SWELLING CLAYS (HIGH PERM) | 2 | 4 |
|   | 2. HIGH CONTENT OF SWELLING CLAYS (LOW PERM) | 4 | 3 |

FIG.8

| # | SITUATION | FLUID A | FLUID A | FLUID B | CONTRIBUTION |
|---|---|---|---|---|---|
| 1 | 1. CONDENSATE WELL | 0 | 3 | 3 | 0 |
|   | 2. HEAVY OIL WELL | 0 | 3 | 2 | 0 |
|   | 3. OIL IN WINTER | 0 | 3 | 2 | 0 |
| 2 | 1. TIGHT GAS RESERVOIR | 1 | 3 | 4 | 0 |
|   | 2. HIGH PERMEABILITY RESERVOIR | 0 | 2 | 5 | 2 |
| 3 | 1. HIGH CONTENT OF SWELLING CLAYS (HIGH PERM) | | 4 | | 0 |
|   | 2. HIGH CONTENT OF SWELLING CLAYS (LOW PERM) | | | | |

WELLBORE TREATMENT FLUID SELECTION ADVISOR

FIELD OF THE INVENTION

This invention relates to the art of well services, and more particularly to a user friendly interactive computer system, to aid an engineer in selecting a proper treatment fluid for a particular situation. This interactive computer system, also called "the Advisor" in the remaining part of this specification is typically used in the art of constructing and stimulating subterranean wellbore for water or hydrocarbons production.

BACKGROUND OF THE INVENTION

In the art of wellbore services, numerous treatment fluids are pumped into the well and eventually into the formation. For instance, fracturing fluids are pumped to create a conductive flow path for the hydrocarbons trapped in the formation and thus facilitate enhanced recovery of the same. Fracturing fluids are required to initiate and propagate a fracture to its desired length, and provide necessary width and viscosity to transport, and efficiently place proppant inside the fracture.

The desired fluid properties are obtained through a combination of additives such as polymeric additives used for controlling the viscosity. However, the fluid composition may somehow be altered during the treatment. For instance, during the job execution most of the polymeric fluids have a tendency to dehydrate due to the phenomenon known as fluid loss, thus resulting in higher concentrations of polymer inside the proppant pack. This can hinder the movement of hydrocarbons inside the fracture. To ensure a proper clean up the fluid must be adequately loaded with ample amount of breakers to enable proper disintegration of polymers.

The above example is just an example showing that selection of proper treatment fluids mainly involves a delicate balance between the basic fluid requirements such as adequate viscosity, stability at higher temperatures, lower friction pressures, low fluid leak off coefficients, etc. and fluid properties that may be detrimental to the job such as tendency to form emulsions, shear degradation, high initial stresses, improper clean-up f the pack, etc. A wide range of parameters pertaining to formation and fluid characteristics need to be evaluated in order to arrive at an optimum fluid design. Some of these parameters are independent and some work in conjunction with another and can alter the affect of one another if they co-exist. This leads to several possible combinations and to carry out analysis of each in the limited decision making time is humanly impossible. This may result in a tendency to selecting or pumping the fluids that have "traditionally" enabled proper execution of job and have helped in "reasonable" recovery of the hydrocarbons after the job, thus leaving little room for improvement or allowing introduction of latest technology.

Moreover, the well services industry typically operates in relatively remote locations. Though the use of modern communications tools such as Internet has greatly enhanced the possibility of exchanging information with distant experts, it would be often beneficial to appeal to their expertise even for ordinary operations.

Therefore it would be suitable to provide a convenient tool to aid in selecting a fluid appropriate for a given situation while taking advantage of experts' knowledge. Such a tool also could be helpful for training new entrants and by providing concise statements validating a selection and/or a non-selection of other candidates.

SUMMARY OF THE INVENTION

The invention is an interactive computer system for providing help in selecting a well-services treatment fluid, the system comprising a act of fluid families, a set of relevant fluid characteristics and a set of digital ratings of each fluid family with regard to these characteristics. The Advisor further includes a set of job parameters pertaining to the treatment and qualitative ratings of said parameters estimating their relevance in the effective success of a treatment. An interface allows the user to enter the job parameters values known to him. Built in rules, associated with calculating means such as an integrated spreadsheet, match fluid characteristics and job parameters and trigger the elimination of fluids that are not compatible with some value of the job parameters and compute a confidence index for the non-eliminated fluid families, said confidence index based on the sum of the products of the fluid families digital ratings and on the rating of the known job parameter. The Advisor also includes means to display the results.

According to a preferred aspect of the invention, experts provide at least a list of fluid characteristics and a list of job parameters that affect the selection of a fluid family, as well as the ratings of the relative importance of these parameters and the matching and filtering rules. This is indeed an important aspect of the invention to ensure for instance that users will not overlook key criteria of rare occurrence. The specific fluid characteristics are preferably entered also through the control of experts but not necessarily—provided that all fluid characteristics are provided.

Fluids used in well services are suitable within a limited temperature range. Comparing that useful temperature range and the bottomhole temperature of the well is indeed the first filter of suitability of any fluid family and indeed, no recommendation can be made unless the bottomhole temperature of the well is known.

For most applications including, for instance, selecting a fluid family appropriate for a fracturing operation, all other job parameters may remain unknown, and the system will still provide a selection of suitable fluid families based on the temperature of use. However in this later case, the confidence index will be low. Moreover, according to a preferred embodiment of the present invention, where some of the unknown parameters could have triggered the elimination of certain fluid families, a warning message is displayed. With any job parameter added to the system, the confidence index will increase.

BRIEF DESCRIPTION OF THE DRAWINGS

FIG. 5 shows a worksheet with final ratings for a scenario;

DETAILED DESCRIPTION

The invention will be further described in relation to an interactive computer system for fracturing fluid selection but it will be clear for one skilled in the art that the same principles could be use to build other systems for instance to select a fluid appropriate for an acidizing treatment or to select any fluids appropriate for any other types of treatment of subterranean formations such as gravel packing, cleaning etc.

The fluid Advisor according to the present invention requires different collection of data including a set of fluid characteristics, a set of job parameters that may enter into consideration for selecting a fluid, and a set of rules linking the fluid characteristics to the job parameters.

The main fluid characteristics should be the temperature interval in which the fluid is useful; in other words for a fracturing fluid, the temperature interval within which the fluid offers maximum stability and efficiently carries the proppants inside the fracture, along with several other requirements.

Other relevant fluid characteristics will be, for instance, the capacity to form an emulsion on contacting formation fluid, capillary effects for gas formations, reactivity with formation clay, pH, Yield stress, leak-off properties, ability to transport proppant, ability to generate early viscosity, shear sensitivity, environmental friendliness, friction factor, fluid cost, whether a fluid is a gelled oil. Some of the characteristics such as the temperature interval of stability do not require expert opinion since the ranges are set after adequate laboratory and field-testing and are typically well documented in fluids engineering manuals. Others are simply YES/NO values; again that information is usually readily available.

The second set of data to be considered include job parameters, distributed between formation properties and job details. For helping with the selection of a fracturing fluid, the formation properties to be considered may include beyond the formation temperature, formation fluid type (gas, oil or condensate), the reservoir permeability, the reservoir pressure, the Young's modulus, the Fracturing gradient, the Barrier Fracturing Gradient, the existence of natural fractures, the sensitivity to fluid pH, the presence of clay (and the consecutive sensitivity to aqueous fluid) etc. Job details that may be considered include for instance where the well is located (on-land or off-shore or anywhere where some specific environmental laws may be applicable), the desired fracture length, the desired proppant distribution in the fracture, the pumping rates, some well completion details such as tubular sizes, deviated wells, etc. and surface temperature.

An important aspect of well services is that several—if not most—of the job parameters are often unknown to the fluid engineer. It is therefore important that the Advisor allows these job parameters to remain in blank (unknown status). Where a specific value of some parameters would have triggered the elimination of some fluids—as it is the case for instance if a fluid type is not compatible with gas but the nature of the formation fluid is unknown to the fluid engineer—then a warning message is preferably displayed for the engineer to either get the needed information or to assume the worse case scenario and disregard potentially harmful selections.

The selection of a fluid is essentially a two-step process: first, some fluids are eliminated through the use of a succession of filters; then, the selected (non-eliminated) fluids are rated.

Figure 1:
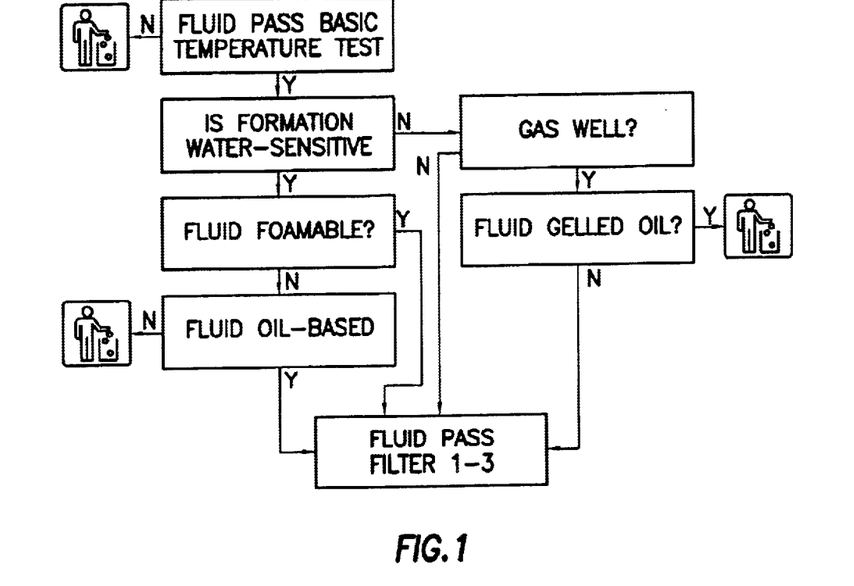
FIG. 1 is a flowchart used as a selection guide for a fracturing fluid depending on the well temperature, the formation fluid type and the water-sensitivity of the formation.

FIG. 1 is a flow chart that shows how several successive filters can be used to de-select a fluid type. To be noted that in this flowchart Y and N are respectively used for Yes and No or don't know. In that examples, the following three rules are considered:

Rule A: For a fluid to be selected, it has to pass the basic temperature range test. If the user-entered temperature is within the range of a fluid, the fluid gets selected.

Rul A1: If the formation is gas, the fluids of the gelled-oil type have to be excluded. Exception is made if the formation water-sensitivity is set at Yes. F r all others reservoir fluid values (oil, Heavy oil, not sure), only rule A applies.

Rule A2: If the formation is declared water-sensitive, only FOAM and oil-based fluid will be used. This implies that gelled oil series is in, even if it is a gas formation. No straight fluids without foam are allowed.

For a fracturing fluid system, other rules will preferably be further implemented such as:

Rule A3: If the formation is gas and if the formation permeability is selected as "Below 0.1", foam fluids have to be included even if the reservoir is not depleted. Gelled oils and oil-base fluids are excluded.

Rule A4_1: If the reservoir is not depleted, exclude all foams from the previous selection, except if the foam is included because of rule A3.

Rule A4_2: If the reservoir is depleted, select all water base foams, and do not show straight (un-foamed) liquid fluids. This step includes gelled oils foams also.

Rule A5: If the reservoir is depleted below the gradient of oil column, then show gelled oils foams, otherwise show only gelled oils fluids.

Rule B2: If user chooses to provide cool down and if the formation permeability is more than 5 md and fracture length is less than 300 ft, then the situation is ideal for cool down. Now check if the entered surface temperature is outside the fluid range of temperature.

Figure 2:
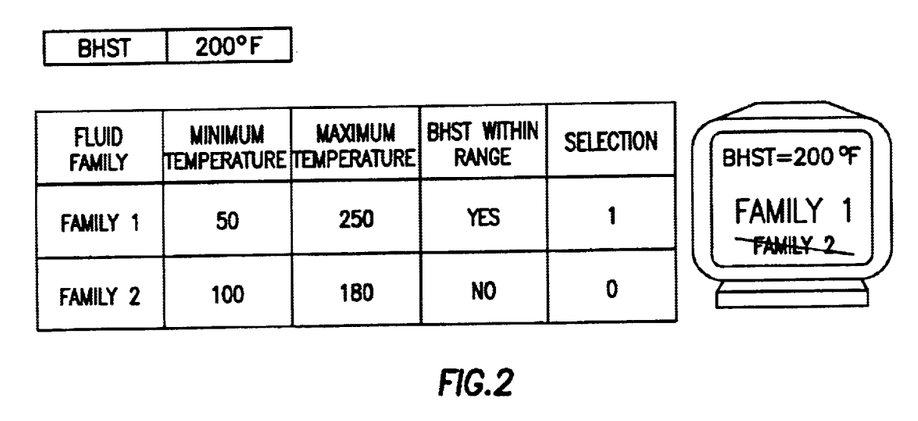
FIG. 2 illustrates the basic temperature screening.

The rules are preferably treated by simply using a spreadsheet such as an Excel spreadsheet (Excel is a trademark of Microsoft Corporation, Redmond, Wash.). FIG. 2 shows how bottomhole static temperature (BHST) is used to narrow down the list of probable fluid families that can be pumped for a particular situation. The BHST is actually the only data that the user needs to be entered for getting a basic selection (an average value may be proposed by default for training purposes).

Figure 3:
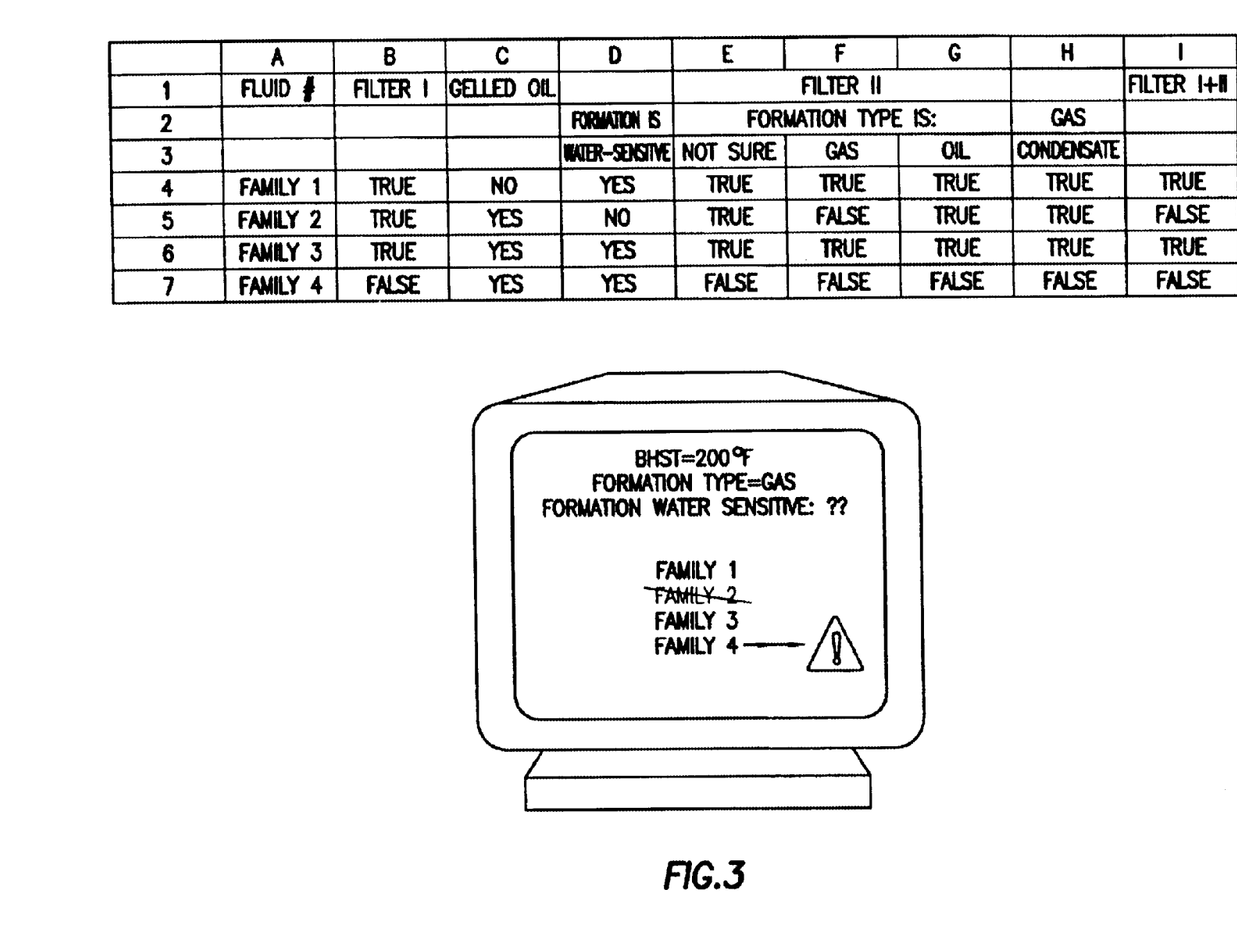
FIG. 3 illustrates the basic of screening through a succession of filters.

Following this initial screening, other screenings are performed as illustrated FIG. 3 for rule A1. Columns A and B are the result of the basic temperature test. In this example the first 3 fluids pass the test. Column C is a reading from the fluid characteristics, where YES indicates that the fluid is gelled oil. The user interface questions the user about the nature of the formation fluids. This parameter is entered through a drop down button with 4 options: unknown, oil, gas or condensate, and is repeated in cell H2 for convenience. To be noted that in the test of rule A1, the value GAS is the only one that triggers the elimination of a fluid by changing the selection from TRUE to FALSE if the fluid is gelled oil (see cell F5). Columns E, F, G and H correspond to the different possible scenarios. The value of H2 determines which of these four columns is selected. To be noted that the following logical rules are used:

TRUE*TRUE=TRUE
TRUE*FALSE=FALSE
FALSE*FALSE=FALSE

In other words, a fluid that has already been sanctioned by a preceding rules can no more be qualified.

In the preferred embodiment shown in FIG. 3, a warning message may be displayed if the user does not know the nature of the formation fluids and the fluid is gelled oil.

Following the execution of all elimination rules, the selection now comprises a subset of fluid families that were not excluded. According to an important aspect of the invention, a set of possible events or scenario is attached to different ranges of value of the job parameters. For instance, the permeability of a formation will be considered as very low (below . . . ), low, medium or high. More complex scenarios include different parameters. Each scenario is rated by at least one expert, preferably by a pool of experts to evaluate its impact on the treatment. This rating is preferably under the form of a numeric value, for instance with 1 for a situation that has little impact and 5 for the utmost critical scenario.

For the selection of a fracturing fluid, Table 1 lists possible combinations of fluid characteristics and job details. Each of this combination receives a rating from 1 to 5, based on the effective relevance of that combination.

The following scenarios may be for instance considered as relevant for selecting a fracturing fluid; the column "Final Rating" providing the rating of the importance to give to that scenario if it occurs. Note that for a given fluid characteristics, some of the situations are self-excluding. For instance, in scenario #12 (environmentally friendly), it is clear that the well can either be offshore or on-land but not simultaneously both. With other scenarios, such as #11, several combinations are possible (the well may be either shallow, medium or deep) while the tubing may be of small or large size.

TABLE I

| Scenario# | Fluid Characteristics | Situation | Final Rating |
|---|---|---|---|
| #1 | Frac Fluid Emulsion Tendency. Compatibility with formation fluids. | 1. Condensate Well | 3 |
|  |  | 2. Heavy Oil Well | 5 |
|  |  | 3. Oil in Winter | 5 |
| #2 | Gas Formation + R1tv.K or capillary effect | 1. Tight gas reservoir | 3 |
|  |  | 2. High permeability reservoir | 1 |
| #3 | Clay Sensitivity | 1. High content of swelling clays (high perm) | 4 |
|  |  | 2. High content of swelling clays (low perm) | 2 |
|  |  | 3. Low content of swelling clays (Smoctite) | 2 |
| #4 | pH Form Compatibility | 1. Client requests neutral or low pH | 5 |
| #5 | Frac Fluid Yield Stress Effect | 1. High perm (internal filter cake) | 4 |
|  |  | 2. Medium to high permeability (wall bldg) | 3 |
| #6 | Proppant Pack Clean Up | 1. High permeability | 4 |
|  |  | 2. Low permeability | 5 |
|  |  | 3. High reservoir pressure grad (>0.35) | 3 |
|  |  | 4. Med. reservoir pressure grad (0.25–0.35) | 4 |
|  |  | 5. Low reservoir pressure grad (>0.25) | 5 |
| #7 | Frac Fluid Leak off | 1. Low reservoir permeability (<0.1 md) | 1 |
|  |  | 2. Med-Low reservoir permeability (0.1 to 5 md) | 2 |
|  |  | 3. Med-High reservoir permeability (5–200 md) | 4 |
|  |  | 4. High reservoir permeability (<200 md) | 5 |
|  |  | 5. Natural Fracture/Fissure reservoir | 5 |
| #8 | Proppant Transport | 1. Small Fracture (<100 ft) | 3 |
|  |  | 2. Medium Fracture (100–300 ft) | 4 |
|  |  | 3. Long Fracture (>300 ft) | 5 |
|  |  | 4. High Proppant Density | 5 |
|  |  | 5. Medium Proppant Density | 4 |
|  |  | 6. Low Proppant Density | 2 |
| #9 | Near Wellbore Early Viscosity High Viscosity | 1. Tortuosity | 5 |
|  |  | 2. High Youngs Modulus (>6 E6 psi) | 5 |
|  |  | 3. Low Youngs Modulus (<1 E6 psi) | 2 |
|  |  | 4. Low Frac Height/High Stress Contrast | 4 |
| #10 | Shear Sensitivity | 1. Job through tubing at high rate | 4 |
|  |  | 2. Job through casing or senulus | 2 |
| #11 | Frac Fluid Friction | 1. Shallow well (<4000 ft) | 2 |
|  |  | 2. Medium depth well (4000–10000 ft) | 4 |
|  |  | 3. Deep well (>10000 ft) | 4 |
|  |  | 4. Small tubing size available for frac job | 4 |
|  |  | 5. Large tubing size available for frac job | 3 |
| #12 | Enviromentally Friendly | 1. Offshore | 5 |
|  |  | 2. Onland | 2 |
| #13 | Frac Fluid Cost | 1. Fluid cost less than 15% of Frac Cost | 3 |
|  |  | 2. Fluid cost 15 to 30% of Frac Cost | 4 |
|  |  | 3. Fluid cost greater than 30% of Total frac Cost | 5 |
| #14 | Fracture Width | 1. High | 5 |
|  |  | 2. Medium | 4 |
|  |  | 3. Low | 3 |
| #15 | Sea Water | 1. Only Sea Water Available | 4 |

Figure 4:
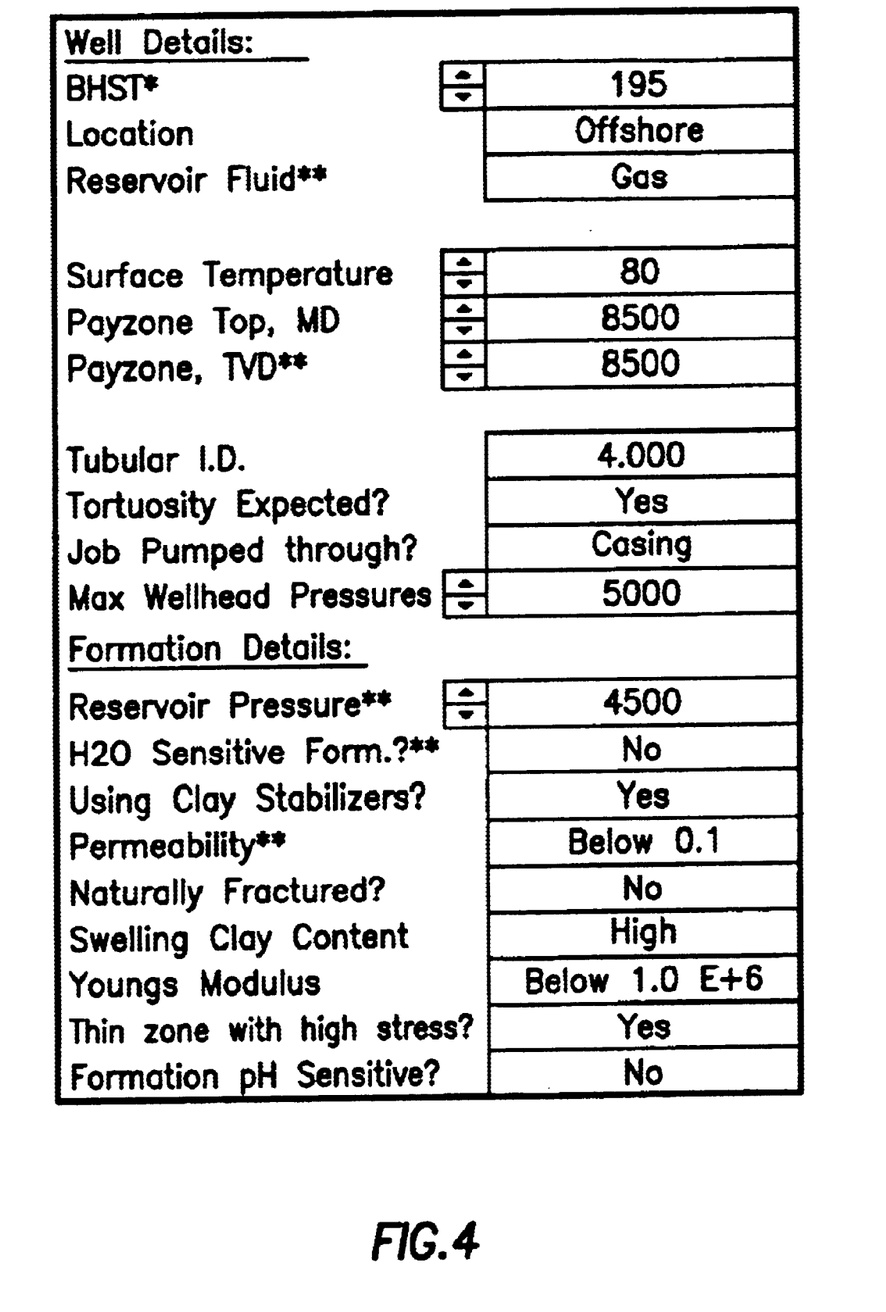
FIG. 4 shows a partial copy of an input screen.

In practice, many of the parameters may be unknown at least at the time a first screening of candidate fluids is performed. This should not prevent the system from providing a rating for a candidate fluid but will essentially affect the confidence in the result such that the engineer should be aware that the proposed recommendation is likely to have been different if more data had been provided. For instance, let us assume that the inputted values are as shown in FIG. 4, a partial copy of an input screen. Based on the inputted values, a new column of the worksheet can be built that represents the importance of the scenario for the real case. This is illustrated in FIG. 5, where column D shows the type of reading and comparisons used to compute the final rating column E. In column D, the formula are written using standard BASIC language, in other words of the type IF (Logical test; value if true, value if false).

In the present example, since the user has indicated that the type of the fluid formation is "gas", it is irrelevant that a fluid be suitable for condensate oils, heavy oils or winter oil. Therefore, the final rating for that information is null. As it can be seen, some scenarios are more complex, and combine several characteristics. See for instance #6 that converts the question "oil in winter" to "Is the type of formation fluid oil, and in that case, is the surface temperature below 60° F".

Figure 6:
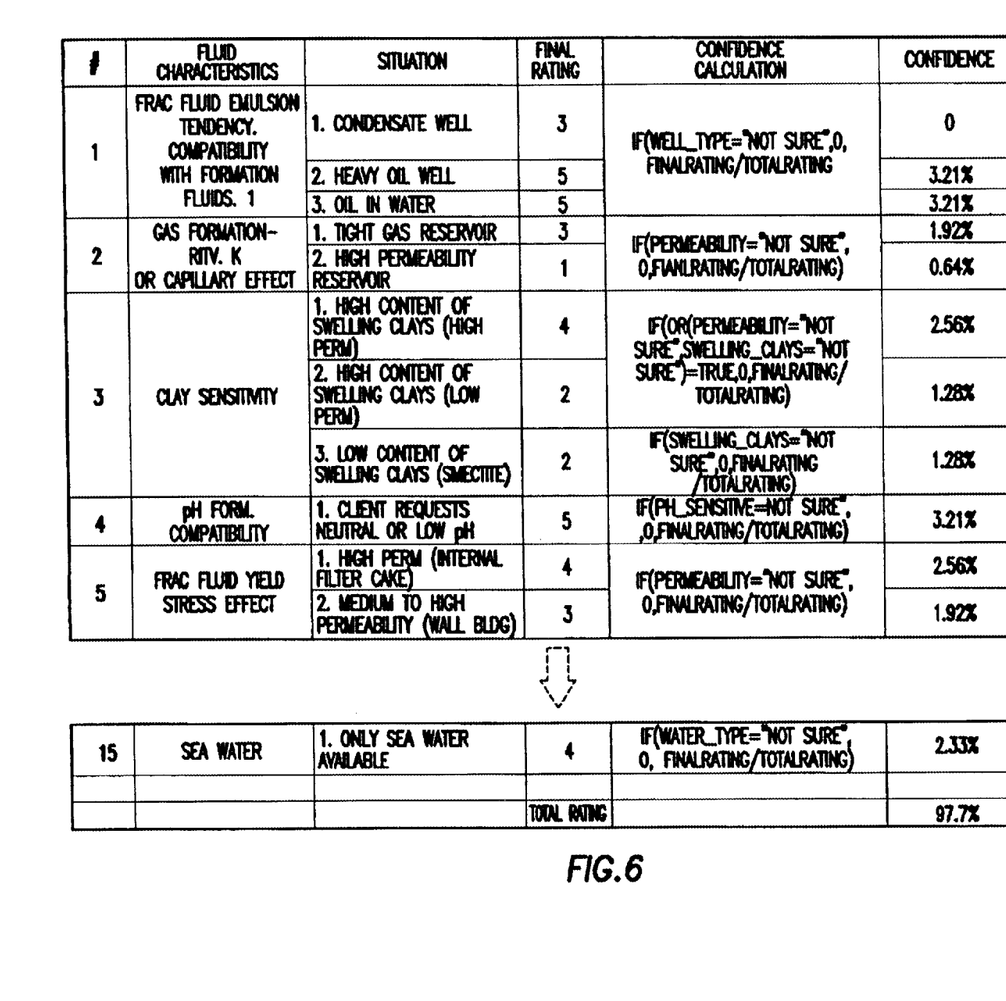
FIG. 6 shows a worksheet showing confidence in the results.

The next step is to compute the confidence on results, taking into account if a value is known or remains uncertain. This is done as illustrated in FIG. 6 by calculating the ratio of the final ratings of each scenario to the sum of all final rating for each scenario where the relevant variables are effectively inputted. In the present example, the sum of all the final ratings (noted TotalRating) was equal to 172 (some scenarios are not shown for clarity purpose). Since the type of fluid formation is known, the contribution to the confidence index of the scenario "condensate oil" is therefore equal to 3 (final rating of said scenario) to 172, or 1.74%.

In the exemplified case, the user has entered most relevant data, meaning that the rating of the fluids will be presented with a confidence index of 97.7% (therefore, it is believed that there is more than 97% chance that the fluid rated number 1 be effectively the best option among the different fluid types available).

The final step is to rate the different available fluids, not only disregarded during the initial screening process. This rating is based on a table built through questionnaires to experts that assign a unique confidence number to each fluid type for all of the proposed scenarios. Again a rating of 1 to 5 is used, with 1 for least favorable condition and 5 stating that, particular fluid is most applicable and may be used with highest confidence. For confidence numbers designated for a range, the sensitivity is preferably checked to see if they could be varied for various values within the specified range so as to make the consultation more dynamic. Confidence numbers are preferably provided in the form of a table along with algorithm to inter/extrapolate them.

Figure 7:
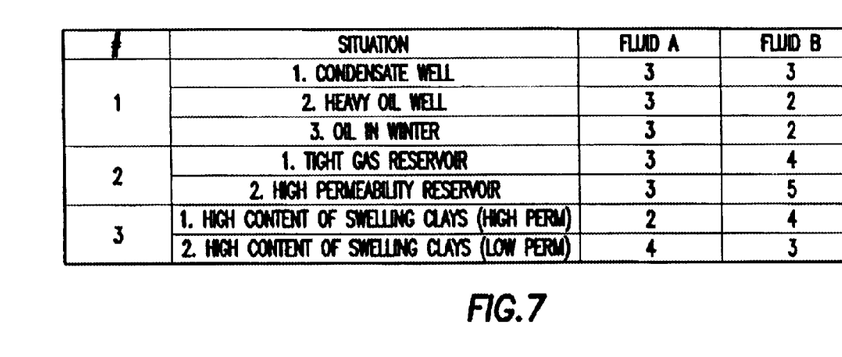
FIG. 7 shows an example of comparing the ranking for two fluids.

An example of ranking for 2 fluids (noted fluid A and fluid B) is provided in FIG. 7 (again, for clarity purpose, the ranking is only provided for the first scenarios). In the Fluid A has been rated 3 for condensate well, as fluid B but fluid B is rated only 2 for heavy well. Since each scenario is individually rated, no fluid is a priori a "good" or "bad" fluid.

Figure 8:
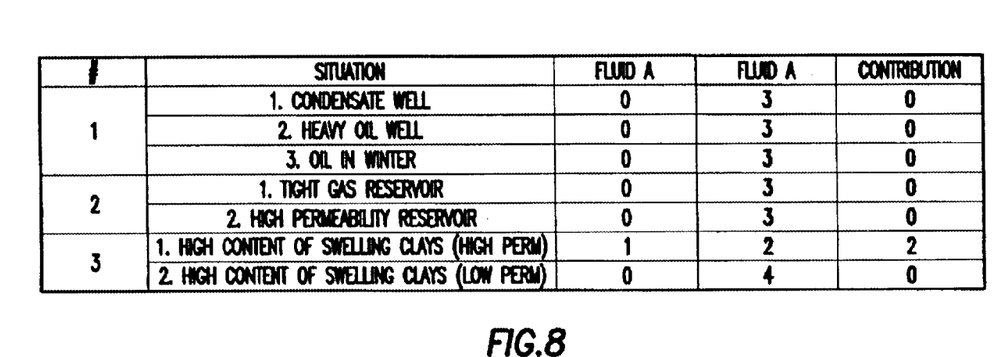
FIG. 8 illustrates the contribution of ratings to the final ranking.

The real case rating of each scenario, as obtained FIG. 5, indicating the importance of a particular parameter for a given combination of scenarios, is finally combined with the fluid rating as obtained FIG. 7 to obtain a final ranking of each preselected fluid. According to one embodiment of the invention, this final ranking is based on the sum of the products of the real case ratings and fluid ratings for all possible scenarios. FIG. 8 shows how the two ratings provide the individual contribution of each scenario to the final rating of Fluid A by simply multiplying the value. At the end, the sum of all individual contributions is computed and the fluids are presented in order (the highest sum corresponding to the most suitable fluid), and the confidence index is also displayed.

Other techniques, including rules and algorithms may be applied for some specific cases. Normalizing of the results may be carried out if the resultant values are too close. Apart from these, knowledge from a few other fluid selection trees available for instance from the fluid engineering manuals may be used to generate rules.

The rating of each fluid is advantageously free of any prejudice—or assumed degree of confidence—a user may have based on his/her experience in the real world and further provides a strong justification of the choice.

What is claimed is:

1. A computer system to help in selecting a well treatment fluid comprising:

a) a set of fluids families each fluid family comprising a set of fluid characteristics determining the relevance of a specific fluid family for a specific treatment and a set of digital ratings related to these characteristics;

b) a set of job parameters comprising information pertaining to the formation to be treated and to the job schedule wherein for one or more job parameters, a set of scenarios corresponding to a range of values of the one or more parameters is provided, each scenario being assigned a qualitative rating defining its importance in the success of a treatment;

c) a set of connecting rules matching the fluid families characteristics and the job parameters, said set including filtering rules that trigger the elimination of fluid families whose characteristics are not compatible with a job parameters;

d) a user interface for entering values of the job parameters known to the user;

e) calculating tools including a spreadsheet to eliminate the fluids whose characteristics are not compatible with one or more known job parameters and to compute confidence index the remaining fluid families, said confidence index based on the sum of the products of the fluid family digital ratings and on the rating of the known job parameters; and f) means to display the subset of non-eliminated fluid families and their respective confidence index.

2. The computer system of claim 1 further comprising a set of caution messages, alerting the user that some fluid types may be eliminated depending on the value of an unknown job parameter.

3. The computer system of claim 1, further comprising multi-parameter scenarios and a qualitative rating of these multi-parameter scenarios.

4. The computer system of claim 3, where each fluid family is further assigned a confidence rating for each multi-parameters scenario.

5. The computer system of claim 4, wherein the treatment is acidizing.

6. The computer system of claim 4, wherein the treatment is fracturing.

7. The computer system of claim 1, where each fluid family is further assigned a confidence rating for each scenario.

8. The computer system of claim 7, wherein the treatment is acidizing.

9. The computer system of claim 1, wherein the treatment is a well stimulation treatment.

10. The computer system of claim 7, wherein the treatment is fracturing.

* * * * *